United States Patent Office 3,327,120
Patented June 20, 1967

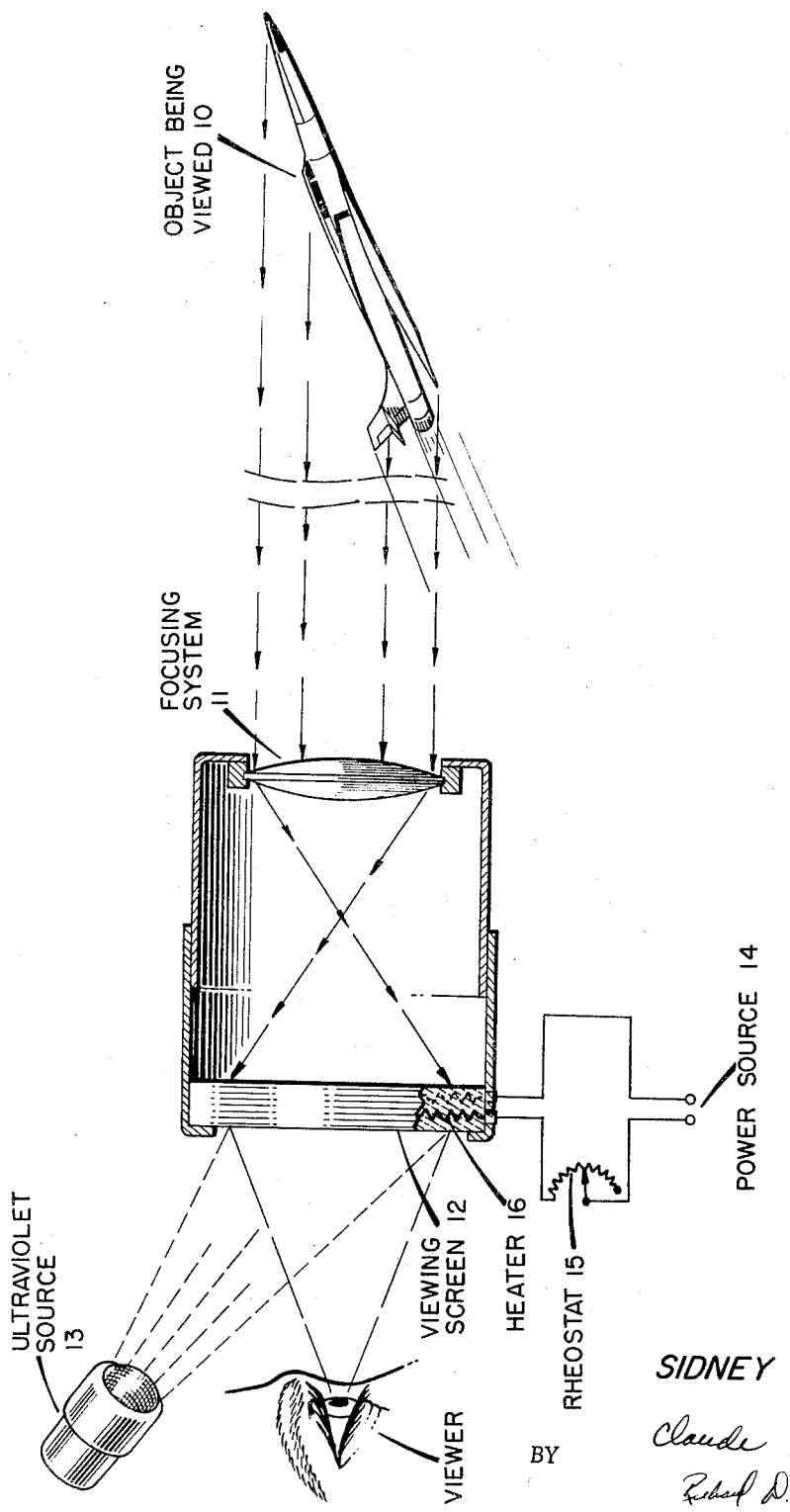

3,327,120
INFRARED IMAGING SYSTEM USING A PHOTO-CHROMIC GLASS VIEWING SCREEN
Sidney Weiss, 6431 Earlham Drive,
Bethesda, Md. 20034
Filed Oct. 29, 1964, Ser. No. 407,594
2 Claims. (Cl. 250—83.3)

ABSTRACT OF THE DISCLOSURE

A viewing system which permits continuous observation of objects obscured by darkness, haze, fog, etc., comprises a photochromic glass viewing screen for receiving the object images. The screen is darkened by ultraviolet light and selectively brightened by infrared radiation emanating from the scene to be viewed in order to enable a viewing of the obscured objects.

---

The invention described herein may be manufactured and used by or for the Government of the United States of America for governmental purposes without the payment of any royalties thereon or therefor.

This invention relates to means for providing a continuous visual image of an object obscured by darkness, haze, fog, or the like. More particularly, this invention relates to means for continuously viewing an infrared image.

Several systems which permit observation of objects obscured by darkness, haze, fog, or the like are known in the prior art. Radar has been successfully employed under such circumstances. Its use, however, requires heavy, space consuming, and complex equipment. Furthermore, a considerable amount of training and experience is necessary before a radar operator is able to interpret and identify the nature of the non-pictorial image provided. Another type of elaborate device described in United States Patent No. 3,064,134 consists of a combination of a photoconductor material and a thermochromatic material. Through a two-step operation, incoming radiation is converted to heat which in turn produces a change in color on the viewing screen. A third type of system described in United States Patents Nos. 3,085,469, 3,134,297, and 3,134,674 utilizes light sensitive dyes in solution to control the brightness of an image. The ability of these light sensitive dyes to respond to the presence or absence of light is limited to a finite number of cycles. Thus, utility of these materials is limited in a continuous viewing type of application.

Accordingly, it is an object of this invention to provide a system which permits continuous viewing of objects or scenes obscured by darkness, haze, fog, or the like.

It is a further object of this invention to provide a viewing system which furnishes a substantially pictorial representation of the object or scenes to be viewed.

It is another object of this invention to provide a viewing system which permits continuous viewing of objects or scenes which are illuminated by, or which emit, infrared radiation.

Still another object of this invention is to provide a viewing system which is compact, light weight, and simple in construction.

Other objects, advantages and novel features of the invention will become apparent from the following detailed description of the invention when considered in conjunction with the accompanying drawing wherein:

The figure illustrates a schematic embodiment of this invention.

A recent discovery in the field of silver halide crystals led to the significant development of photochromic glasses. As is well known, silver halide crystals present in a photographic gelatin emulsion are irreversibly decomposed by light, and thereby form a silver image. However, when submicroscopic silver halide crystals are precipitated in glass during a reheating cycle, they behave quite differently. As would be expected, the glass quickly darkens when it is struck by light. However, when the light is removed the glass clears again and becomes transparent. The darkening and clearing cycle of the glass can be repeated indefinitely, without any sign of fatigue.

The physical properties of these photochromic glasses, such as the reaction rates of darkening and fading, the spectrum of sensitivity to darkening radiation, the spectral absorption of the glass in its darkened state, and the effect of temperature on the reaction rates, are dependent upon the composition and prior heat treatment of the glass. Generally, these glasses are darkened by radiation in the short wave length end of the spectrum, whereas they fade when exposed to the longer wave length portion of the spectrum. In the case of the silver chloride photochromic glasses, they are darkened only by ultraviolet light, and are darkened more completely when exposed only to ultraviolet light than they are when simultaneously exposed to both ultraviolet and visible light. These glasses fade more rapidly when exposed to the longer wave visible light and the near infrared than they do in the dark. The degree of darkening increases with the intensity of light, and the reaction to darkening light can be almost instantaneous. The darkening rate of these glasses is relatively insensitive to temperature, whereas the fading rate in the dark increases with temperature. The silver halide glasses are completely reversible and are immune to fatigue.

This invention utilizes these properties of photochromic glasses to provide a new and improved viewing screen.

Referring now to the figure, there is illustrated an object 10 which may be representative of an object or scene which it is desired to view. Image producer 10 is a source of infrared radiation. This infrared radiation may result from illumination of the image producer by atmospheric glow or by an artificial infrared source used in conjunction with the viewing system. Alternatively, the image producer 10 may itself be an original source of infrared radiation resulting from temperature difference. The infrared radiation emanating from the image producer 10 is focused by means of a schematically-represented lens system 11 onto the photochromic glass viewing screen 12. A single lens is illustrated, but it is to be understood that it schematically represents whatever enlarging, reducing, and/or inverting lenses are deemed desirable. Furthermore, a removable filter (not illustrated) for blocking all non-infrared wave lengths during daylight operation may also be provided. A source of ultraviolet light 13 illuminates the viewing screen 12. An electrical power source 14 provides a current whose magnitude may be controlled by rheostat 15 for the purpose of supplying current to a heater wire 16 imbedded in screen 12. The purpose of this heater will be described hereinafter.

In operation, viewing screen 12 is illuminated with ultraviolet light by light source 13. The continuous irradiation of viewing screen 12 by the ultraviolet light maintains screen 12 in a normally darkened state. Simultaneously, the infrared radiation emanating from the object 10 or scene being viewed is focused onto the screen 12. The object or scene becomes visible because of the difference in shading between the overall darkened area and the lightened, infrared irradiated portion of the screen on which the image falls.

Because of the substantially instantaneous response of the viewing screen to light, a continuously changing scene can be observed. Control of the degree of image retention or afterglow can be achieved by selection of glass chemistry and heat treament. With a given viewing screen panel, this afterglow can be varied as desired by variation of the ambient temperature of the screen. In some circumstances, particularly where it is desired to detect movement, some afterglow may be desirable. It is for this purpose that heater 16 and rheostat 15 are provided. It is to be noted that heating element 16 will itself be a source of infrared radiation. To avoid interference with the image, the heating wires may be disposed so as to form the grid lines of a polar or rectangular coordinate system useful for ranging or plotting purposes.

It is contemplated that the novel viewing system described herein may find utility in such applications as surveillance, aircraft traffic control, weather plotting, and the like.

Obviously many modifications and variations of the present invention are possible in the light of the above teachings. It is therefore to be understood that within the scope of the appended claims the invention may be practiced otherwise than as specifically described.

I claim:

1. A method for continuously viewing scenes obscured by darkness, haze, fog, or the like comprising
    continuously irradiating a photochromic glass viewing screen with ultraviolet light thereby maintaining the screen in a normally darkened condition;
    focusing infrared radiation emanating from the scene to be viewed onto the photochromic glass viewing screen thereby locally and selectively brightening the screen; and
    adjusting the temperature of the viewing screen thereby providing a predetermined period of image retention;
    whereby a substantially pictorial visible image of the scene being viewed is formed and retained, which image is continuously responsive to changes in the scene under observation.

2. A system for continuously viewing scenes obscured by darkness, haze, fog, or the like comprising
    a photochromic glass viewing screen;
    a source of ultraviolet light for continuously irradiating and maintaining said screen in a normally darkened condition;
    a lens system for focusing infrared radiation emanating from the scene under observation onto said viewing screen for locally and selectively brightening said screen; and
    means for adjusting the temperature of said screen for producing a period of image retention;
    whereby a substantially pictorial image of the scene being viewed is formed and retained.

References Cited

UNITED STATES PATENTS

| | | | |
|---|---|---|---|
| 3,085,469 | 4/1963 | Carlson | 88—106 X |
| 3,152,215 | 10/1964 | Barstow et al. | 88—106 X |
| 3,155,451 | 11/1964 | Dunster et al. | 88—106 X |

ARCHIE R. BORCHELT, *Primary Examiner.*